(12) United States Patent
Axelson

(10) Patent No.: US 9,675,038 B2
(45) Date of Patent: Jun. 13, 2017

(54) ARRANGEMENT AND METHOD FOR ANALYZING MILK

(75) Inventor: Johan Axelson, Bromma (SE)

(73) Assignee: DELAVAL HOLDING AB, Tumba (SE)

( * ) Notice: Subject to any disclaimer, the term of this patent is extended or adjusted under 35 U.S.C. 154(b) by 461 days.

(21) Appl. No.: 13/640,050

(22) PCT Filed: Mar. 30, 2011

(86) PCT No.: PCT/SE2011/050368
§ 371 (c)(1),
(2), (4) Date: Oct. 9, 2012

(87) PCT Pub. No.: WO2011/126432
PCT Pub. Date: Oct. 13, 2011

(65) Prior Publication Data
US 2013/0025541 A1    Jan. 31, 2013

Related U.S. Application Data

(60) Provisional application No. 61/322,572, filed on Apr. 9, 2010.

(30) Foreign Application Priority Data

Apr. 9, 2010   (SE) ........................................ 1050348

(51) Int. Cl.
*A01J 5/007*   (2006.01)
*A01J 5/013*   (2006.01)

(52) U.S. Cl.
CPC ............. *A01J 5/007* (2013.01); *A01J 5/0132* (2013.01)

(58) Field of Classification Search
CPC .. A01J 5/007; A01J 5/01; A01J 5/0132; A01J 5/0131; A01J 5/013; A01J 5/0133; A01J 5/0136

(Continued)

(56) References Cited

U.S. PATENT DOCUMENTS 4,574,736 A *  3/1986  Tanaka et al. ............. 119/14.08
5,388,549 A     2/1995  Holroyd
(Continued)

FOREIGN PATENT DOCUMENTS

DE    10 2005 026723 A1    12/2006
EP     0 564 023 A1        10/1993
(Continued)

OTHER PUBLICATIONS

International Search Report, dated Aug. 18, 2011, from corresponding PCT application.

(Continued)

*Primary Examiner* — Son T Nguyen
(74) *Attorney, Agent, or Firm* — Young & Thompson

(57) ABSTRACT

A milk analyzing system is disclosed, which includes a milk constituent analyzing unit configured to analyze milk from a milking station with respect to a specific constituent of the milk, and a control device communicatively connected to the milking station and to the milk constituent analyzing unit. The control device is configured to retrieve an analyzing appropriateness parameter for each of the animals milked by the milking station indicating an appropriateness of analyzing milk from the animal with respect to the specific constituent. The control device is configured to control the milk constituent analyzing unit to analyze milk from the milking station with respect to the specific constituent when the time elapsed from when the milk constituent analyzing unit last analyzed milk exceeds a threshold time period, irrespective of the analyzing appropriateness parameter for the animal milked by the milking station.

20 Claims, 2 Drawing Sheets

(58) Field of Classification Search
USPC ......... 119/14.02, 14.03, 14.08, 14.14, 14.15, 119/14.18
See application file for complete search history.

(56) References Cited

U.S. PATENT DOCUMENTS

| | | | |
|---|---|---|---|
| 5,746,153 A | 5/1998 | Hoefelmayr | |
| 6,651,583 B1* | 11/2003 | Lind et al. ................. | 119/14.02 |
| 2002/0124803 A1 | 9/2002 | Chen et al. | |
| 2002/0139309 A1* | 10/2002 | van den Berg et al. ... | 119/14.08 |
| 2003/0019431 A1* | 1/2003 | van den Berg et al. ... | 119/14.02 |
| 2003/0061993 A1* | 4/2003 | Vijverberg et al. ........ | 119/14.14 |
| 2004/0025606 A1* | 2/2004 | Veenstra ................. | A01J 5/007 73/865.9 |
| 2004/0168647 A1* | 9/2004 | Brown .................... | A01J 5/007 119/14.41 |
| 2004/0194712 A1 | 10/2004 | Johannesson et al. | |
| 2004/0244696 A1* | 12/2004 | Woolford et al. ......... | 119/14.03 |
| 2005/0115506 A1* | 6/2005 | Van Den Berg et al. . | 119/14.03 |
| 2005/0223996 A1 | 10/2005 | Bosma et al. | |
| 2006/0191485 A1 | 8/2006 | Francke et al. | |
| 2007/0137580 A1* | 6/2007 | Brown .................... | A01J 5/007 119/14.14 |
| 2007/0272159 A1* | 11/2007 | Francke et al. ............ | 119/14.14 |
| 2008/0035063 A1 | 2/2008 | Birk et al. | |
| 2008/0282985 A1 | 11/2008 | Schulte | |
| 2008/0314322 A1* | 12/2008 | Stellnert et al. .......... | 119/14.02 |
| 2009/0165725 A1* | 7/2009 | Kaever ................... | A01J 5/007 119/14.02 |
| 2009/0272325 A1 | 11/2009 | Sogaard et al. | |
| 2010/0089324 A1* | 4/2010 | Markusson ................ | 119/14.02 |
| 2010/0263595 A1 | 10/2010 | Francke | |
| 2011/0232576 A1* | 9/2011 | Van Der Tol et al. .... | 119/14.02 |
| 2011/0303155 A1* | 12/2011 | Tucker et al. ............. | 119/14.02 |

FOREIGN PATENT DOCUMENTS

| | | | | |
|---|---|---|---|---|
| EP | 713641 A1 * | 5/1996 | ............. | A01J 5/017 |
| EP | 1245150 A1 * | 10/2002 | ............. | A01J 5/017 |
| EP | 1 709 867 A1 | 10/2006 | | |
| RU | 2 112 364 C1 | 6/1998 | | |
| RU | 2 340 171 C2 | 12/2008 | | |
| RU | 2 380 895 C2 | 2/2010 | | |
| WO | 2006/105990 A2 | 10/2006 | | |
| WO | WO 2008051137 A1 * | 5/2008 | ............. | A01J 5/007 |
| WO | 2008/066440 A1 | 6/2008 | | |
| WO | WO 2008069734 A1 * | 6/2008 | ............. | A01J 5/007 |

OTHER PUBLICATIONS

International-Type Search Report, dated Sep. 30, 2011, from corresponding PCT application.
Supplementary International Search Report, dated Jul. 26, 2012, from corresponding PCT application.

\* cited by examiner

ARRANGEMENT AND METHOD FOR ANALYZING MILK

TECHNICAL FIELD

The invention relates generally to milking systems for milking animals, in which milk is analyzed. In particular, the invention relates to an arrangement and a method for analyzing milk in such milking systems.

BACKGROUND AND PRIOR ART

In the field of dairy farming, systems for regularly measuring the health of the animals and the milk quality have been developed. The results of the measurements may affect how the animals should be milked, i.e. how milking parameters such as vacuum levels and milking frequency are set, how the animals should be fed, and how the animals should otherwise be treated on an individual basis. Hereby, the animals are kept healthy and an efficient milk production is provided.

Examples of such systems include milking installations comprising automatic milking robots that identify an animal, extract milk from the animal, and transfer the milk to a milk storage tank. There also exist robots that can sample part of the milk for testing, e.g. transferring the sample part to an automatic somatic cell counter that provides the cell count. Each robot in such systems is provided with its own cell counter, which is connected to a data bus of the robot. In such a manner, the robot receives a quality indication of the milk of the animal. An example of such a milking robot is the VMS (voluntary milking system) having an OCC (online cell counter) as provided by DeLaval.

In systems having a plurality of milking robots, which all are provided with their own analysis equipment, the robots transfer the test results, in this case the cell counts, together with the animal identities to a monitoring computer so that information for a specific animal is collected in a single database, regardless of which one of the robots that was used to milk the animal. The collecting activities can be controlled by one of the robots operating as a master unit, where the others operate as slave units. Alternatively, an overall controller, such as a computer, is provided for receiving animal and milking information, such as identities, milk yields, cell counts and other milk quality or animal health indications, from the robots. Such a system having a plurality of milking systems, where each has a cell counter, is easy to use and can provide cell count data immediately. However, the cell counter makes each milking robot more expensive. Moreover, a lack of balance of the use of different milking robots leads to a lack of use of some of the sampling and analyzing devices. This may have a negative influence on the operation and reliability of such equipment.

Generally, the use of sampling and analyzing devices in milking systems comprising one or more milking robots or stations has this far not been optimized. There is a certain lack of knowledge of when and how such sampling and analyzing devices shall be used in an optimized manner.

SUMMARY OF THE INVENTION

An object of the invention is therefore to provide an arrangement and a method for analyzing milk, which overcome the disadvantages of the prior art and still provide measurements in a satisfying manner.

A further object of the invention is to provide an arrangement and a method for analyzing milk, which can benefit from the knowledge that it is not always necessary to test milk from every animal at every milking occasion.

A yet further object of the invention is to provide an arrangement and a method for analyzing milk, wherein a single milk constituent analyzing unit, such as a cell counter, can be used for analyzing milk from several milking stations.

A still further object of the invention is to provide an arrangement and a method for analyzing milk, wherein the utilization of a single milk constituent analyzing unit is optimized.

The above objects are attained by arrangements and methods as claimed in the appended claims.

According to one aspect of the invention an arrangement for analyzing milk is provided in a milking system comprising at least one milking station adapted to identify an animal in the milking station automatically and to extract milk from the animal automatically. A milk constituent analyzing unit, such as a cell counter, capable of analyzing milk from the milking station with respect to the specific constituent, such as the cell content, is provided. A control device is communicatively connected to the milking station and to the milk constituent analyzing unit and is arranged to retrieve an analyzing appropriateness parameter for each of the animals milked by the milking station indicating an appropriateness of analyzing milk from the animal with respect to a specific constituent. The control device is further arranged to control the milk constituent analyzing unit to analyze milk from the milking station with respect to the specific constituent only when (i) the analyzing appropriateness parameter for the animal milked by the milking station exceeds a threshold value and/or (ii) the time lapsed since the milk constituent analyzing unit last analyzed milk exceeds a threshold time period.

In one embodiment, the arrangement is implemented in a milking system comprising at least two milking stations, each of which being adapted to identify an animal in the milking station automatically and to extract milk from the animal automatically. The milk constituent analyzing unit is capable of selectively analyzing milk from each of the milking stations with respect to the specific constituent. The control device is communicatively connected to each of the milking stations and is arranged to retrieve an analyzing appropriateness parameter for each of the animals milked by each of the milking stations indicating an appropriateness of analyzing milk from the animal with respect to a specific constituent. The control device is further arranged to control the milk constituent analyzing unit to selectively analyze milk from the milking stations with respect to the specific constituent only when (i) the analyzing appropriateness parameter for the animal milked by that milking station exceeds a threshold value and/or (ii) the time lapsed since the milk constituent analyzing unit last analyzed milk exceeds a threshold time period.

If the appropriateness parameter is defined such that the higher it is, the more appropriate it is to analyze milk from the animal with respect to the specific constituent, the control device is arranged to control the milk constituent analyzing unit to selectively analyze milk from each of the milking stations for which the analyzing appropriateness parameter for the animal milked by that milking station is above an appropriateness parameter threshold value. If this holds true for more than one milking station, the control device may be arranged to control the milk constituent analyzing unit to selectively analyze milk from these milking stations consecutively in some specified order, e.g. starting with the milking station for which the analyzing appropriateness parameter for the animal milked by that milking station is highest and then following with the other milking stations in order of decreasing appropriateness parameter.

Alternatively, the control device is arranged to control the milk constituent analyzing unit to selectively analyze milk from the milking stations with respect to the specific constituent in the order the milking stations finish milking the animals. Hereby, the limited resources constituted by the single milk constituent analyzing unit can be used in an optimized manner to analyze milk from the animal which is most appropriate to be analyzed.

If the time lapsed since the milk constituent analyzing unit last analyzed milk exceeds the time threshold value, the control device is arranged to control the milk constituent analyzing unit to analyze milk irrespective of whether the analyzing appropriateness parameters for the animal is below the threshold value. The milking station from which milk, which is analyzed, originates may e.g. be the milking station which has milked (or is milking) the animal with the highest appropriateness parameter among the animals being milked. Hereby, it is ensured that the milk constituent analyzing unit will not stand still for longer periods of time without being used. As a result the milk constituent analyzing unit will not be clogged or fail in any other manner due to long periods of non-use.

The analyzing appropriateness parameter for each of the animals is based on data for that animal. The data may comprise any of the result of a previous analysis of the milk of the animal; the time lapsed since the milk constituent analyzing unit last analyzed milk from the animal with respect to the specific constituent; physiological data for the animal; historical measured data for the animal; and/or an indication with respect to the animal in a database of the animals held by, or accessible to, the control device. The indication may be an indication that the animal is any of ill, in early lactation, fed in a specific manner, under treatment, and/or producing milk of a specific quantity or quality.

According to another aspect of the invention a method for analyzing milk in a milking system comprising single or multiple milking stations is provided. According to the method an analyzing appropriateness parameter is retrieved for each of the animals milked by the milking station or stations indicating an appropriateness of analyzing milk from the animal with respect to a specific constituent. A milk constituent analyzing unit, which is capable of analyzing milk from the milking station or stations with respect to a specific constituent, is controlled to selectively analyze milk from the milking station or one of the milking stations with respect to the specific constituent only when (i) the analyzing appropriateness parameter for the animal milked by that milking station exceeds a threshold value and/or (ii) the time lapsed since the milk constituent analyzing unit last analyzed milk exceeds a threshold time period.

BRIEF DESCRIPTION OF THE DRAWINGS

The invention will be described in greater detail below with reference to the accompanying drawings, in which.

DETAILED DESCRIPTION OF EMBODIMENTS

In the following description, for purposes of explanation and in order to provide an understanding of the present invention, exemplifying embodiments are presented. However, it will be apparent to one skilled in the art that the present invention may be practiced in other embodiments that depart from the specific details of these examples. Moreover, detailed descriptions of well-known methods and apparatuses are omitted so as not to obscure the description of the present invention with unnecessary details.

Figure 1:
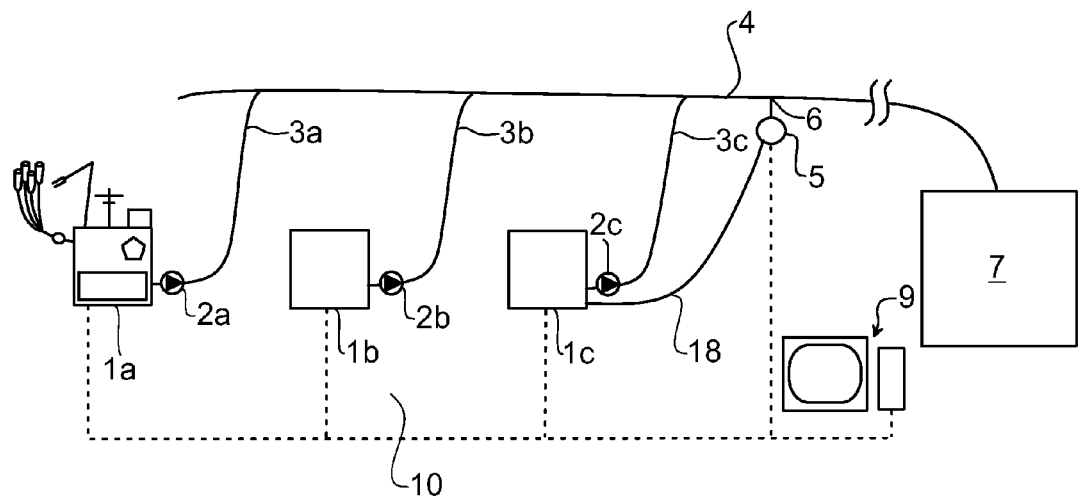
FIG. 1 illustrates a first embodiment of a milking system comprising a plurality of milking stations in accordance with the invention.
Figure 2:
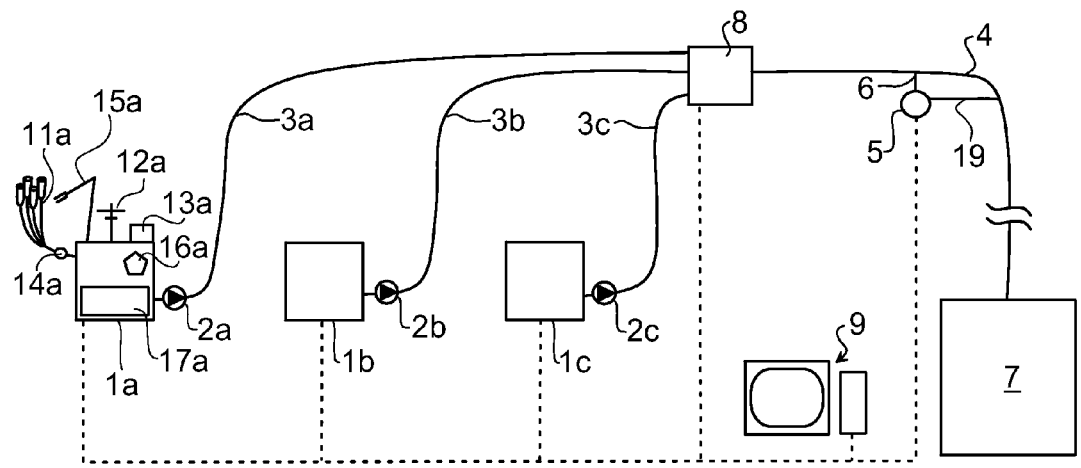
FIG. 2 illustrates a second embodiment of a milking system comprising a plurality of milking stations in accordance with the invention.

FIGS. 1 and 2 illustrate milking systems 10, each including milking stations 1*a-c* arranged for milking animals, such as cows, for example on a voluntary basis. The milking stations 1*a-c* are of the same type and each include a milk pump 2*a-c* connected to a milk storage tank 7 by means of milk lines 3*a-c* and 4.

FIG. 1 illustrates how each milking station 1*a-c* is individually connected to the common milk line 4. Figure illustrates an alternative embodiment where each milking station 1*a-c* is connected via its individual milk line 3*a-c* to a common valve arrangement 8, which in turn is connected to the common milk line 4.

Figure 3:
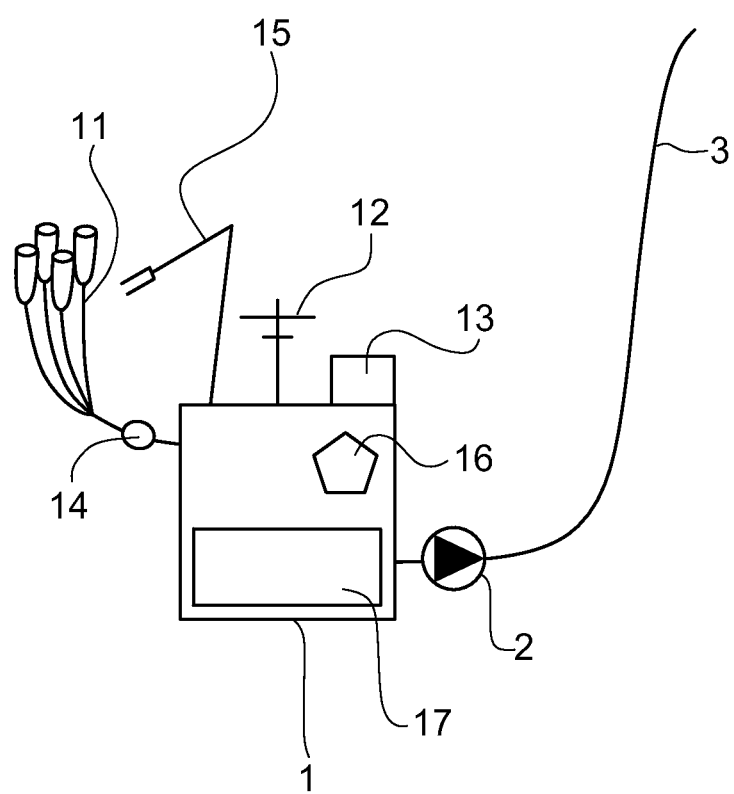
FIG. 3 illustrates one of the milking stations of FIGS. 1 and 2 in greater detail.

One example of a milking station 1 to be used in the invention is illustrated in greater detail in FIG. 3. The milking station 1 includes teat cups 11, a robot arm 15 for automatic attachment of the teat cups 11 to the teats of an animal present in the milking station 1, a milk receiving container 17 to which the teat cups 11 are connected, a vacuum source (not explicitly indicated) connected to the teat cups 11 via the milk receiving container 17 in order to draw milk from the teats of the milk animal during milking, and a milk meter 14 for measuring the milk drawn. Further, the milking station 1 comprises an identification device 13 provided to identify an animal in the milking station 1 and a control device 16 for controlling the milking in the milking station 1.

The control device 16 is communicatively connected to a central control device 9 (FIGS. 1 and 2) e.g. via a data bus. The connection is illustrated as a data connection (a broken line), and can, for example, be provided for by cable or fiber in a computer network, or can be a wireless connection, exemplified by an antenna 12. The central control device 9 handles animal data and comprises typically a microcomputer, software and a database. It can suitably be provided with a user interface, including a display and, for example, a keyboard.

The central control device 9 can alternatively be arranged in one of the milking stations 1*a-c* and be integrated with the control device 16 thereof. In such manner this milking station can be a "master" milking station having a control device for overall control whereas the other milking stations are "slave" milking stations with control devices 16 for their internal control and with communication with the control device of the "master" milking station for the overall control.

Yet, alternatively, the central control device 9 can be integrated into the milk storage tank 7 and be provided to control various tasks such as e.g. cleaning and cooling of the milk tank 7.

The control device 16 of each milking station 1*a-c* and the central control device 9 are also communicatively connected to a cell counter 5 (FIGS. 1 and 2), such as an online cell counter (OCC), via the data bus. The cell counter 5 is connected to the milk line 4 referred to as a common milk line 4 since it is common for all the milking stations 1a-c of the milking system via a milk sampling device 6.

The milking systems may comprise further equipment and devices such as e.g. non-return valves, filters, cooling devices, etc., which are not illustrated in the Figures.

During a typical milking operation an animal is identified by the identification device 13 and enters the milking station 1. During milking, milk is drawn from the teats of the animal by means of the vacuum applied to the teat cups 11. The milk drawn is measured by means of the milk meter 14, after which it is collected in the milk receiving container 17.

Alternatively, one milk meter 14 may be provided for each teat cup 11 for measuring the individual milk flow from each teat. Further, each teat cup 11 can be individually connected to a separate compartment of the milk receiving container 17. The measured amount is then stored in the database, using the animal identity, together with a time and date indication.

Thus, each milking station 1a-c collects data obtained during the milking operation and transfers the data to the central control device 9 that stores the data. The central control device 9 can also suitably be adapted to keep a check on if the animal is healthy, should be examined, if its milk should be tested, and/or if the farmer should be notified.

After the milking has been completed the cow may leave the milking station 1. The extracted milk is then pumped, from the milk receiving container 17 to the milk storage tank 7 (FIGS. 1 and 2), by means of the pump 2, via one of the milk lines 3a-c (depending on the milking station used) and the common milk transfer line 4.

The milk sampling device 6 is arranged to divert a sample of the milk in the common milk line 4 to the cell counter under control thereof. The milk sampling device 6 comprises an inlet, a valve and a conduit for leading milk from the common milk line 4 to the cell counter 5, and preferably a filter in the flow direction between the common milk line 4 and the cell counter 5 (none of which being illustrated). The milk sampling device 6 can include a, so called, knife outlet for diverting milk from the common milk line 4, it can be arranged to use the force of gravity for leading the milk from common milk line 4, or it can be provided with a pump controlled by the cell counter 5 for pumping milk from the common milk line 4 to the cell counter 5.

Excessive milk being sampled by the milk sampling device 6 can be led back from the cell counter 5 to one of the milking stations 1a-c or to the common milk line 4. For this purpose a tube 19 is arranged between the cell counter 5 and the milking station 1c and the common milk line 4, respectively, as being exemplified in FIGS. 1 and 2, respectively.

There is a risk that sampled milk is affected by remains from a previous milk sample. To prevent this, the first milk of a sample is led back to the milking system via the tube 19 and is not analyzed. In this way the first milk of a sample cleans the system from milk remains from an earlier sample.

The cell counter 5 is arranged to analyze the sampled milk with respect to the cell content, and the result of the analysis of the sampled milk with respect to the cell content, i.e. the cell count, is associated with the identity of the animal or the identities of the animals, from which the sampled milk was extracted. The sampling, analyzing, and associating are preferably performed on a regular basis.

By arranging the milk sampling device 6 in the common milk line 4 it is possible to test milk from any milking station using a single milk sampling device. For this purpose the system is advantageously adapted to control the pumping of milk through the common milk line 4 by the milking stations 1a-c. The control of the milk transfer is preferably performed by the central control device 9.

The system is preferably adapted to only transfer milk from one animal at a time in the common milk line 4 when the milk is sampled so that milk from several animals is not mixed before being analyzed.

According to the invention the central control device 9 is arranged to retrieve an analyzing appropriateness parameter for each of the animals milked by the milking stations 1a-c indicating an appropriateness of analyzing milk from the animal with respect to the cell count. The analyzing appropriateness parameter for each of the animals is based on data for that animal, such as the result of a previous analysis, e.g. cell count, of the milk of the animal; the time lapsed since the cell counter 5 last sampled milk from the animal; physiological data for the animal; historical measured data for the animal; and/or an indication with respect to the animal in a database of the animals held by, or accessible to, the central control device 9. The indication may be an indication that the animal is any of ill, in early lactation, fed in a specific manner, under treatment, and/or producing milk of a specific quantity or quality.

In an exemplary embodiment the analyzing appropriateness parameter, $P_{AA}$, for a given animal may be given as:

$$P_{AA}=a*CC+b*T_{LA}+c*I_1+d*I_2+e*I_3+f*I_4$$

wherein CC is a previous cell count of the milk from the animal, $T_{LA}$ is the time lapsed since the cell counter last sampled milk from the animal, $I_1$ is a parameter indicating whether the animal is ill ($I_1=1$ if the animal is ill and $I_1=0$ if the animal is healthy), $I_2$ is a parameter indicating whether the animal is in early lactation ($I_2=1$ if the animal is in early lactation and $I_2=0$ if the animal is not in early lactation), $I_3$ is a parameter indicating whether the animal produces milk of a given quality ($I_3=0$ if the animal produces milk of the given quality and $I_3=1$ if the animal produces milk of a worse quality), and a, b, c, d, and e are weighting factors giving the importance of each of the terms of the sum forming the analyzing appropriateness parameter $P_{AA}$.

It shall be appreciated that while the analyzing appropriateness parameter is exemplified in the manner above, the present invention is not limited in this respect. Actually, the analyzing appropriateness parameter can be determined in a large variety of manners readily available to a skilled person after having read the detailed description of embodiments as found in this document.

Further, the central control device 9 is arranged to control the cell counter 5 to selectively sample milk from one of the milking stations 1a-c depending on (i) the analyzing appropriateness parameter for the animal milked by that milking station and/or (ii) the time lapsed since the cell counter 5 last sampled milk from any of the milking stations and to analyze the sampled milk from that milking station with respect to the cell content.

The first condition is used to prioritize the sampling and analyzing, e.g. only animals having analyzing appropriateness parameter above a threshold value will have their milk sampled and analyzed. If several animals milked simultaneously by the milking stations 1a-c have an analyzing appropriateness parameter above the threshold value their milk can be sampled and analyzed in some order, e.g., in order of highest analyzing appropriateness parameter. Alternatively, the threshold value may be updated depending on the analyzing appropriateness parameter(s) for animal(s) milked by other one(s) of the milking stations. I.e. if many animals have appropriateness parameter above the threshold value, the threshold value may be increased. Hereby, some animals having analyzing appropriateness parameter above the old threshold value may not have their milk sampled and analyzed at a given instance if the threshold value is below the updated threshold value.

It shall, however, be appreciated that the analyzing appropriateness parameters of the animals may be updated continuously and repeatedly depending on various criteria, and they can be set such that all animals will eventually have their milk sampled and analyzed.

The second condition is used to ensure a certain usage of the cell counter 5 such that it will not be clogged. For instance, the central control device 9 may be arranged to control the cell counter 5 to selectively sample milk from one of the milking stations 1*a-c* if the time lapsed since the cell counter 5 last sampled milk from any of the milking stations 1*a-c* exceeds a threshold time period and to analyze the sampled milk from that milking station with respect to the cell count irrespective of the analyzing appropriateness parameter for the animal milked by that milking station.

The cell content in the milk stored in the milk storage tank 7 can be predicted based on analyses with respect to the cell counts as performed by the cell counter 5. Such approach is further disclosed in WO 2008/121050, the contents of which being hereby incorporated by reference. If the cell count becomes too high, the central control device 9 may be informed and may take actions in response thereto. In such manner the cell count in the milk stored in the milk storage tank 7 can be regulated.

The cell counter 5 as being described in the present description may be exchanged for any kind of milk constituent analyzing unit for analyzing milk with regard to a specific constituent of the milk, for instance, a hormone, protein, or fat. Hence, the amount of such a specific constituent in the milk stored in the milking tank 7 can be predicted from repeated analyses performed by the milk constituent analyzing unit.

Further, if the milk constituent analyzing unit can be arranged directly in the common milk line to analyze milk therein with regard to the specific constituent of the milk, the milk sampling arrangement may be dispensed with.

Yet further, the invention may be applied to a plurality of different milk constituent analyzing units connected to a milk sampling arrangement for sampling of milk from the common milk line or arranged to analyze milk flowing in the common milk line.

It shall still further be appreciated that the principle of the present invention can likewise be implemented in a milking system including a single milking station.

The invention claimed is:

1. A milk analyzing system for analyzing milk in a milking system including at least one milking station (1*a*, 1*b*, 1*c*) automatically identifying an animal in the at least one milking station and automatically milking the animal, the milk analyzing system comprising:
 a milk constituent analyzing unit (5) that analyzes milk received from the at least one milking station with respect to a specific constituent of the milk; and
 a control device (9) communicatively connected to the milk constituent analyzing unit, the control device (9) retrieves an analyzing appropriateness parameter for each individual animal milked by the at least one milking station, the analyzing appropriateness parameter indicates an appropriateness of analyzing milk from the individual animal with respect to the specific constituent, the analyzing appropriateness parameter being based on data for the individual animal,
 the control device (9) controls the milk constituent analyzing unit (5) to
  analyze milk from the at least one milking station, with respect to the specific constituent for the individual animal, when the analyzing appropriateness parameter for the individual animal exceeds an analyzing appropriateness parameter threshold value,
  determine a time period of non-use, during which the milk constituent analyzing unit is not analyzing milk, from when the milk constituent analyzing unit last analyzed milk,
  determine that the time period of non-use exceeds a threshold time period, and
  thereafter control the milk constituent analyzing unit (5) to analyze milk from the at least one milking station when the control device determines that the time period of non-use exceeds the threshold time period, irrespective of whether the analyzing appropriateness parameter for the individual animal exceeds the analyzing appropriateness parameter threshold value,
 wherein the threshold time period is based on the milk constituent analyzing unit (5) not becoming clogged or failing due to the time period of non-use.

2. The system of claim 1, wherein the control device controls the milk constituent analyzing unit (5) to analyze the milk when the analyzing appropriateness parameter for the individual animal milked by the at least one milking station has a greater priority with respect to one or more analyzing appropriateness parameters for animals milked by other milking stations.

3. The system of claim 1, wherein the milking system includes at least two milking stations (1*a*, 1*b*, 1*c*), each of which automatically identifies a respective individual animal in the milking station and automatically milks the respective individual animal,
 the milk constituent analyzing unit (5) selectively analyzes milk from each of the milking stations with respect to the specific constituent, and
 the control device (9) is communicatively connected to each of the milking stations and controls the milk constituent analyzing unit (5) to selectively analyze milk from one of the milking stations with respect to the specific constituent only when one or more of (i) the analyzing appropriateness parameter for the respective individual animal milked by the one milking station exceeds the analyzing appropriateness parameter threshold value and (ii) the time elapsed from when the milk constituent analyzing unit last analyzed milk from any of the milking stations exceeds the threshold time period.

4. The system of claim 3, wherein the analyzing appropriateness parameter threshold value is dependent upon one or more analyzing appropriateness parameters for one or more of the animals milked by another one of the milking stations.

5. The system of claim 3, wherein the milking stations are connected to a milk storage tank (7) via a common milk line (4) and transfer milk to the milk storage tank via the common milk line, and
 the milk constituent analyzing unit is connected to the common milk line and selectively analyzes milk from each of the milking stations with respect to the specific constituent.

6. The system of claim 1, wherein the milk constituent analyzing unit (5) selectively samples milk from each of the milking stations and analyzes the sampled milk with respect to the specific constituent.

7. The system of claim 1, wherein the data comprises at least one of a result of a previous analysis of the milk of the specific individual animal, the time elapsed since the milk constituent analyzing unit last analyzed milk from the specific animal with respect to the specific constituent, physiological data for the specific animal, historical measured data for the specific individual animal, and an indication with respect to the specific animal in a database of the animals held by, or accessible to, the control device.

8. The system of claim 7, wherein the indication indicates that the specific animal is one or more of ill, in early lactation, fed in a specific manner, under treatment, and producing milk of a specific quantity or quality.

9. The system of 1, wherein the milk constituent analyzing unit is a cell counter.

10. The system of claim 1, wherein the analyzing appropriateness parameter that indicates the appropriateness of analyzing milk from the individual animal with respect to the specific constituent is based on data of a previous analysis for the specific constituent for the individual animal.

11. The system of claim 1, wherein the data comprises at least two data parameters including a result of a previous analysis of the milk of the specific individual animal, the time elapsed since the milk constituent analyzing unit last analyzed milk from the specific animal with respect to the specific constituent, physiological data for the specific animal, historical measured data for the specific individual animal, and an indication with respect to the specific individual animal in a database of the animals held by, or accessible to, the control device.

12. The system of claim 11, wherein the analyzing appropriateness parameter is determined based on weighting factors assigned for each of the at least two data parameters.

13. The system of claim 1, wherein the milk constituent analyzing unit provides a cell count with respect to the specific constituent of the milk, and the control device is configured to analyze the cell count with respect to a threshold cell count for the specific constituent of the milk.

14. A method for analyzing milk, the method comprising:
utilizing the milk analyzing system of claim 1;
retrieving the analyzing appropriateness parameter for each individual animal milked by the at least one milking station indicating the appropriateness of analyzing milk from the individual animal with respect to the specific constituent of the milk;
providing the analyzing appropriateness parameter threshold value for the analyzing appropriateness parameter and a time period threshold value for the threshold time period; and
analyzing milk from the at least one milking station, at the milk constituent analyzing unit (5) configured to analyze milk from the at least one milking station, with respect to the specific constituent when the time elapsed from when the milk constituent analyzing unit last analyzed milk exceeds the threshold time period, irrespective of the analyzing appropriateness parameter for the individual animal milked by the milking station.

15. The method of claim 14, further comprising analyzing the milk from the at least one milking station, at the milk constituent analyzing unit (5), with respect to the specific constituent when the analyzing appropriateness parameter for the individual animal milked by the at least one milking station exceeds the analyzing appropriateness parameter threshold value.

16. The method of claim 15, wherein the milk is analyzed at the milk constituent analyzing unit (5) when the analyzing appropriateness parameter for the individual animal milked by the at least one milking station has a greater priority with respect to one or more analyzing appropriateness parameters for animals milked by other milking stations.

17. The method of claim 15, wherein the milking system includes at least two milking stations (1a, 1b, 1c), each of which automatically identifies a respective individual animal in the milking station and automatically milks the animal,
the method further comprising:
retrieving the analyzing appropriateness parameter for each respective individual animal milked by each one of the milking stations indicating the appropriateness of analyzing milk from one specific animal with respect to the specific constituent; and
selectively analyzing the milk from one of the milking stations, at the milk constituent analyzing unit (5), with respect to the specific constituent only when one or more of (i) the analyzing appropriateness parameter for the respective individual animal milked by the one milking station exceeds the analyzing appropriateness parameter threshold value, and (ii) the time elapsed from when the milk constituent analyzing unit last analyzed the milk from any of the milking stations exceeds the threshold time period.

18. The method of claim 15, wherein the analyzing appropriateness parameter for the respective individual animal is based on data for the one specific animal, and
the data comprises one or more of a result of a previous analysis of the milk of the specific animal, the time elapsed since the milk constituent analyzing unit last analyzed milk from the specific animal, physiological data for the specific animal, historical measured data for the specific animal, and an indication with respect to the specific individual animal in a database of the animals held by, or accessible to, the control device.

19. The method of claim 18, wherein the indication indicates that the specific animal is one or more of ill, in early lactation, fed in a specific manner, under treatment, and producing milk of a specific quantity or quality.

20. The method of claim 14, wherein the milk constituent analyzing unit is a cell counter.

* * * * *